(12) United States Patent
Naka et al.

(10) Patent No.: US 11,326,610 B2
(45) Date of Patent: May 10, 2022

(54) BLOWER

(71) Applicant: Makita Corporation, Anjo (JP)

(72) Inventors: Shinsuke Naka, Anjo (JP); Ryoji Zama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 21 days.

(21) Appl. No.: 17/085,664

(22) Filed: Oct. 30, 2020

(65) Prior Publication Data

US 2021/0148372 A1 May 20, 2021

(30) Foreign Application Priority Data

Nov. 15, 2019 (JP) .............................. JP2019-207434

(51) Int. Cl.
*F04D 25/08* (2006.01)
*F04D 29/44* (2006.01)
*F04D 29/42* (2006.01)

(52) U.S. Cl.
CPC ......... *F04D 25/08* (2013.01); *F04D 29/4226* (2013.01); *F04D 29/441* (2013.01)

(58) Field of Classification Search
CPC .... F04D 25/0673; F04D 25/08; F04D 27/004; F04D 29/4226; F05D 2270/20
See application file for complete search history.

(56) References Cited

U.S. PATENT DOCUMENTS

| | | | | |
|---|---|---|---|---|
| 6,105,206 A | * | 8/2000 | Tokumaru | E01H 1/0809 15/344 |
| 6,218,633 B1 | * | 4/2001 | Okumura | H01H 9/061 200/321 |
| 7,941,894 B1 | * | 5/2011 | Skorput | A63B 57/50 15/344 |
| 11,071,427 B2 | * | 7/2021 | Bylund | A47L 9/2857 |

FOREIGN PATENT DOCUMENTS

JP   2009-091914 A   4/2009

* cited by examiner

*Primary Examiner* — Ninh H. Nguyen
(74) *Attorney, Agent, or Firm* — Sughrue Mion, PLLC

(57) ABSTRACT

A blower may include a motor; a centrifugal fan configured to rotate with rotation of the motor; a casing configured to guide air from a suction port to a discharge port; a trigger configured to be pressed; and a control board configured to control rotation of the motor. The control board may include a normal mode and a low speed mode. In the normal mode, the control board may be configured to adjust a rotation speed of the motor in accordance with a degree by which the trigger is pressed. In the low speed mode, the control board may be configured to adjust the rotation speed of the motor to a target rotation speed, wherein the target rotation speed is lower than a maximum rotation speed of the motor that is achieved when the degree by which the trigger is pressed is a maximum degree in the normal mode.

6 Claims, 8 Drawing Sheets

BLOWER

CROSS-REFERENCE TO RELATED APPLICATION

This application claims priority to Japanese Patent Application No. 2019-207434 filed on Nov. 15, 2019, the entire contents of which are hereby incorporated by reference into the present application.

TECHNICAL FIELD

The disclosure herein relates to a blower.

BACKGROUND

Japanese Patent Application Publication No. 2009-91914 describes a suction blower. The suction blower comprises a motor, a centrifugal fan, a casing, a suction nozzle, and an opening adjusting plate. The centrifugal fan is configured to rotate about a rotation shaft with rotation of the motor. The casing houses the motor and the centrifugal fan. Further, the casing is configured to guide air from a suction port to a discharge port with rotation of the centrifugal fan. The suction nozzle is inserted into the suction port of the casing. An elongated hole is defined in a side surface of the suction nozzle. The opening adjusting plate is configured to adjust an opening area of the elongated hole. Fallen leaves and the like on the ground are suctioned from a distal end opening of the suction nozzle by the motor being rotated with the distal end opening of the suction nozzle facing the ground.

SUMMARY

Aside from fallen leaves, there are pebbles on the ground, for example. In general, with a suction blower, the pebbles are often suctioned together with the fallen leaves on the ground. In order to reduce suction of pebbles while suctioning fallen leaves, the above-described suction blower needs its opening area to be adjusted by the opening adjusting plate for the elongated hole being slid each time the suction blower is used. Due to this, suction of pebbles cannot be stably reduced in each use of the blower. The disclosure herein discloses art that can stably reduce suction of pebbles.

The disclosure herein discloses a blower. The blower may comprise a motor; a centrifugal fan configured to rotate about a rotation shaft with rotation of the motor; a casing which houses the motor and the centrifugal fan and is configured to guide air from a suction port to a discharge port as the centrifugal fan rotates; a trigger configured to be pressed by an operator; and a control board configured to control rotation of the motor. The control board may include a normal mode and a low speed mode. In the normal mode, the control board may be configured to adjust a rotation speed of the motor in accordance with a degree by which the trigger is pressed (trigger press-in degree). In the low speed mode, the control board may be configured to adjust the rotation speed of the motor to a target rotation speed. The target rotation speed may be lower than a maximum rotation speed of the motor that is achieved when the trigger press-in degree is a maximum degree in the normal mode.

In the above configuration, the target rotation speed of the motor in the low speed mode is lower than the maximum rotation speed of the motor in the normal mode. Thus, a rotation speed of the centrifugal fan is lower in the low speed mode than in the normal mode. As a result, suction power of the blower is lower in the low speed mode than in the normal mode. Due to this, suction of pebbles can be reduced in the low speed mode as compared to in the normal mode. As a result, suction of pebbles can stably be reduced by the control board executing the low speed mode.

DETAILED DESCRIPTION

Figure 1:
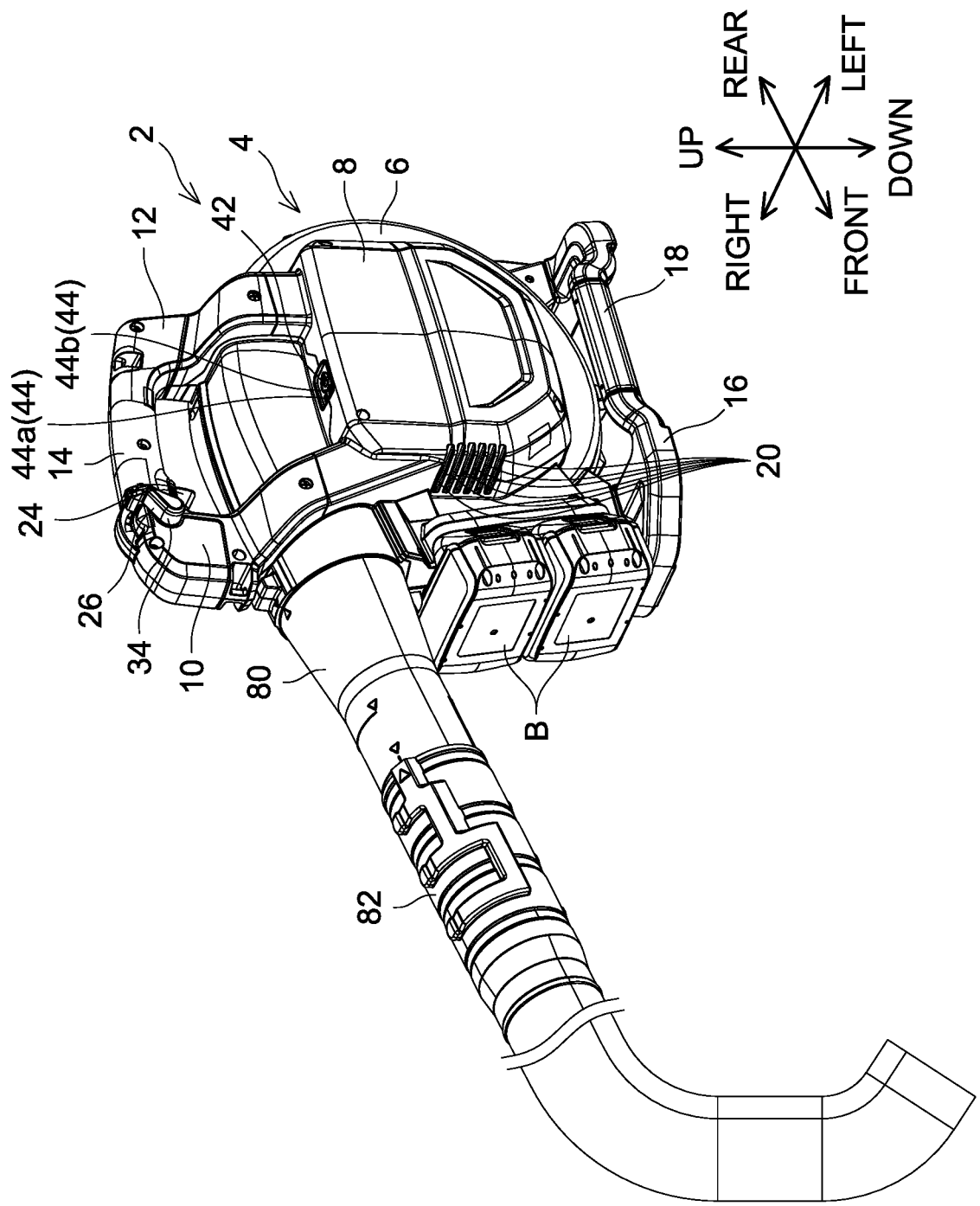
FIG. 1 is a perspective view of a blower 2 according to a first embodiment in a blow mode.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved blowers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a blower may comprise a casing, a motor, a centrifugal fan, and a control board. The casing may comprise therein a first housing chamber and a second housing chamber that communicate with each other through an opening. The motor may be disposed in the first housing chamber and a rotation shaft thereof may be inserted in the opening. The centrifugal fan may be disposed in the second housing chamber and may be configured to rotate about a rotation shaft with rotation of the motor. The control board may be disposed in the first housing chamber and may be configured to control the rotation of the motor. The casing may further comprise a communication hole communicating the first housing chamber with the second housing chamber and located apart from the opening.

In the above configuration, when a pressure in the second housing chamber becomes higher than a pressure in the first housing chamber, air flows from the second housing chamber to the first housing chamber through the communication hole and also flows from the first housing chamber to the second housing chamber through the opening. Thus, the air flows in the first housing chamber even when the pressure in the second housing chamber is higher than the pressure in the first housing chamber, and the control board is cooled sufficiently by this air. As a result, the control board can be suppressed from reaching a high temperature.

In one or more embodiments, the communication hole may be disposed so as to overlap the centrifugal fan in a rotation shaft direction.

In the above configuration, the centrifugal fan feeds the air radially outward. Due to this, disposing the communication hole to overlap the centrifugal fan with respect to the rotation shaft direction suppresses the air fed out by the centrifugal fan from flowing from the second housing chamber into the first housing chamber through the communication hole. This can suppress decrease in a flow rate of air blowing out from the blower.

In one or more embodiments, the blower may further comprise a battery configured to supply power to the motor.

The above configuration enables the blower to be used in an operation area where there is no external power source.

In one or more embodiments, the battery may be disposed close to the control board.

The above configuration allows a length of wiring that connects the battery to the control board to be short. This provides improved arrangement of the wiring.

In one or more embodiments, the blower may further comprise a heat dissipating fin disposed in the first housing chamber and configured to guide the air flowing in the first housing chamber. The heat dissipating fin may be disposed on the control board.

In the above configuration, the air is guided by the heat dissipating fin and flows on the control board. Thus, the control board can be cooled efficiently. As a result, the control board can be suppressed from reaching a high temperature.

In one or more embodiments, the blower may further comprise a cooling fan disposed between the opening and the centrifugal fan with respect to the rotation shaft direction. The cooling fan may be configured to rotate with the centrifugal fan.

In the above configuration, when the cooling fan rotates, a pressure in a space near the cooling fan decreases. This enables the air to efficiently flow from the first housing chamber to the second housing chamber through the opening. As a result, a flow rate of the air flowing in the first housing chamber increases, and the control board can thereby be cooled efficiently. As a result, the control board can be suppressed from reaching a high temperature.

In one or more embodiments, the casing may include a discharge port through which the air fed out by the centrifugal fan is discharged to outside of the casing. The blower may further comprise a blowing nozzle in which the air discharged from the discharge port flows. The blowing nozzle may be an elongated nozzle.

When an elongated nozzle is used as the blowing nozzle, the pressure in the second housing camber generally becomes high with the centrifugal fan rotating. As such, if the blower does not comprise the communication hole, air may be less likely to flow from the first housing chamber to the second housing chamber through the opening when the pressure in the second housing chamber is higher than the pressure in the first housing chamber. As a result, the control board may not be sufficiently cooled and may reach a high temperature. In the above configuration. the communication hole communicates the first housing chamber with the second housing chamber. thus air sufficiently flows through the first housing chamber and the control board is sufficiently cooled even when the elongated nozzle is used as the blowing nozzle. Thus, the control board can be suppressed from reaching a high temperature.

In one or more embodiments, the control board may be disposed on a flow passage of the air flowing in the first housing chamber from the communication hole toward the motor.

In the above configuration, the air flows on the control board. Thus, the control board can be cooled efficiently. As a result, the control board can be suppressed from reaching a high temperature.

In one or more embodiments, the blower may further comprise a motor housing that houses the motor. The motor housing may include a motor suction port through which air is suctioned into the motor housing. The control board may be disposed on an imaginary line connecting the communication hole with the motor suction port.

In the above configuration, the control board is disposed on a line connecting the communication hole with the motor suction port by shortest distance. Thus, the control board can be cooled efficiently. As a result, the control board can be suppressed from reaching a high temperature.

In one or more embodiments, a blower may comprise a motor, a centrifugal fan, a casing, a trigger, and a control board. The centrifugal fan may be configured to rotate about a rotation shall with rotation of the motor. The casing may house the motor and the centrifugal fan and be configured to guide air from a suction port to a discharge port as the centrifugal fan rotates. The trigger may be configured to be pressed by an operator. The control board may be configured to control rotation of the motor. The control board may include a normal mode and a low speed mode. In the normal mode, the control board may be configured to adjust a rotation speed of the motor in accordance with a degree by which the trigger is pressed (trigger press-in degree). In the low speed mode. the control board may be configured to adjust the rotation speed of the motor to a target rotation speed. The target rotation speed may be lower than a maximum rotation speed of the motor that is achieved when the trigger press-in degree is a maximum degree in the normal mode.

In the above configuration, the target rotation speed of the motor in the low speed mode is lower than the maximum rotation speed of the motor in the normal mode. Thus, a rotation speed of the centrifugal fan is lower in the low speed mode than in the normal mode. As a result. suction power of the blower is lower in the low speed mode than in the normal mode. Therefore, suction of pebbles can be reduced in the low speed mode as compared to in the normal mode. As a result, suction of pebbles can stably be reduced by the control board executing the low speed mode.

In one or more embodiments, when the control board is in the low speed mode, the rotation speed of the motor may gradually increase to the target rotation speed as the trigger press-in degree increases to the maximum degree.

In the above configuration, a flow rate of air to be suctioned into the suction port changes according to the trigger press-in degree. Thus, the rotation speed of the motor, that is, the flow rate of air to be suctioned into the suction port can freely be adjusted in accordance with a situation in the operation area.

In one or more embodiments, when the control board is in the low speed mode, the rotation speed of the motor may be constant at the target rotation speed regardless of the trigger press-in degree.

In the above configuration, the rotation speed of the centrifugal fan is constant regardless of the trigger press-in degree, which makes the suction power constant. Thus, the operator can easily perform a suction operation using the blower.

In one or more embodiments, the blower may further comprise a switch configured to switch the normal mode and the low speed mode of the control board.

The above configuration enables the operator to switch the normal mode and the low speed mode by a simple operation of pressing the switch.

In one or more embodiments, the switch may function as a main power switch configured to switch an on-state in which the rotation of the motor is allowed and an off-state in which the rotation of the motor is prohibited. When the switch is long-pressed, the normal mode and the low speed mode of the control board may be switched.

The above configuration enables the operator to perform both an operation of switching the on-state and the off-state of the blower and an operation of switching the normal mode and the low speed mode by using the main power switch. Thus, an additional switch for switching the normal mode and the low speed mode is not necessary.

In one or more embodiments, the blower may further comprise a display configured to display that the control board is in the low speed mode.

The above configuration allows the operator to easily check whether the control board is in the low speed mode or not by information displayed on the display.

First Embodiment

A blower 2 of a first embodiment will be described with reference to FIGS. 1 to 8. The blower 2 is a handheld blower. The blower 2 comprises a blow mode and a suctioning mode. In the blow mode, the blower 2 is capable of blowing off fallen leaves and the like on the ground. In the suctioning mode, the blower 2 is capable of suctioning and collecting fallen leaves and the like on the ground. Hereinbelow, a direction along which a rotation shaft 62a of a motor 62 extends is termed a right-left direction, a direction perpendicular to the right-left direction is termed a front-rear direction, and a direction perpendicular to the right-left direction and the front-rear direction is termed an up-down direction.

FIGS. 1 to 6 show a configuration of the blower 2 in the blow mode. The blower 2 comprises a casing 4, a plurality of (two in the present embodiment) batteries B, a main power switch 42, a display 44, a trigger 24. a cruise valve 26, and a sensor 32 (see FIG. 2). The casing 4 comprises a main casing 6, a side casing 8, a front connecting section 10, a rear connecting section 12, a main grip 14, and a base member 16. The main casing 6 is configured as a volute casing. The side casing 8 is fixed to a left side surface of the main casing 6 with screws. A plurality of suction ports 20 is defined in a front surface of the side casing 8. The suction ports 20 penetrate the side casing 8 in a thickness direction.

The front connecting section 10 extends upward from a front upper portion of the main casing 6. The rear connecting section 12 extends upward from a rear upper portion of the main casing 6. The main grip 14 extends from a rear upper portion of the front connecting section 10 to a front upper portion of the rear connecting section 12. That is, a front end of the main grip 14 is connected to the rear upper portion of the front connecting section 10 and a rear end of the main grip 14 is connected to the front upper portion of the rear connecting section 12. The main grip 14 is disposed above the main casing 6. The main grip 14 is configured to be gripped by an operator. The main grip 14 comprises a conductive material. The conductive material may, for example, be conductive elastomer. The base member 16 is fixed to a lower portion of the main casing 6. When the blower 2 is placed on the ground, only the base member 16 is in contact with the ground. The base member 16 comprises a sub grip 18. The sub grip 18 is separated from the ground when the blower 2 is placed on the ground. Thus, when lifting up the blower 2 placed on the ground, the operator can grip the main grip 14 with one of his/her hands and grip the sub grip 18 with the other hand.

The two batteries B are detachably attached to the front surface of the main casing 6. The two batteries B are electrically connected in series. In a variant, the two batteries B may be electrically connected in parallel. The batteries B may, for example, be lithium ion batteries.

The main power switch 42 and the display 44 are disposed on a middle surface 40 defined by the side casing 8 and the main casing 6. The middle surface 40 is oriented upward. The middle surface 40 is disposed below and left to the main grip 14. The main power switch 42 is configured to be operated by the hand of the operator different from the hand gripping the main grip 14. Due to this, the main power switch 42 can be suppressed from being erroneously operated by the hand gripping the main grip 14. The main power switch 42 is a switch for switching the blower 2 between an on-state and an off-state. When the blower 2 is in the off-state, rotation of the motor 62 (to be described later) is prohibited. Thus, the motor 62 does not rotate even when the trigger 24 is pressed in. On the other hand, when the blower 2 is in the on-state, the rotation of the motor 62 is allowed. Thus, the motor 62 rotates when the trigger 24 is pressed in. The state of the blower 2 is displayed on the display 44. In the present embodiment, the display 44 comprises two display windows 44a, 44b. The display window 44a is configured to display that the blower 2 is in the on-state when the blower 2 is in that state. The display window 44b is configured to display that a control board 66 (to be described later) is in a low speed mode M2 when the control board 66 is in that mode. The display 44 is, for example, an LED panel. In a variant, the display 44 may be configured to light up.

Figure 2:
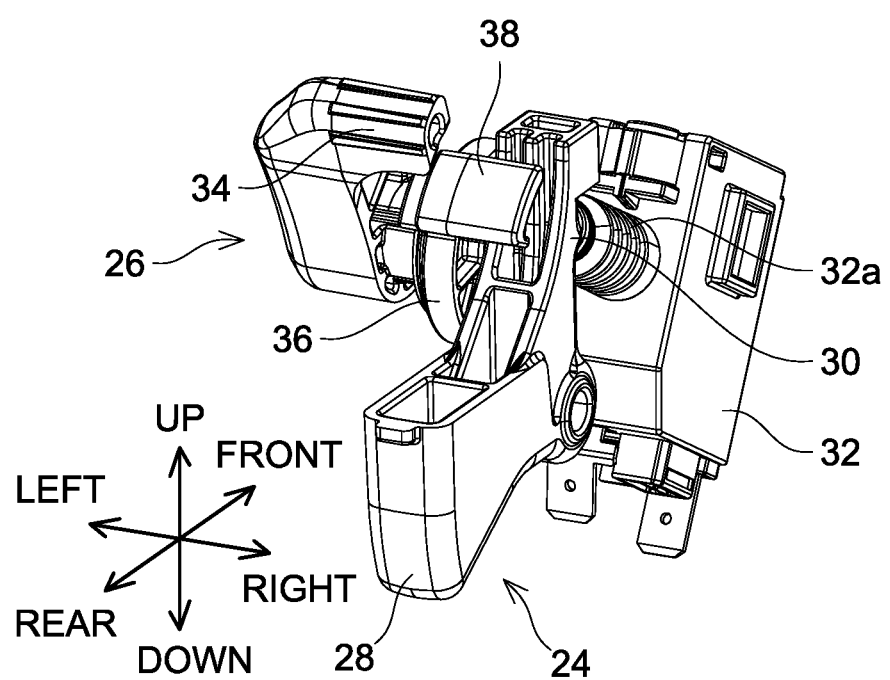
FIG. 2 is a perspective view of a trigger 24, a cruise valve 26, and a sensor 32 of the blower 2 according to the first embodiment.

The trigger 24 and the cruise valve 26 are pivotably attached to the main grip 14. As shown in FIG. 2, the trigger 24 comprises a trigger operation portion 28 and a presser 30. The trigger operation portion 28 and the presser 30 are integrated. The trigger operation portion 28 is a portion configured to be pressed in by the operator. The trigger operation portion 28 is configured to pivot about a pivot axis extending in the right-left direction. The presser 30 is configured to press a switch 32a of the sensor 32 by pivot of the trigger operation portion 28. When the blower 2 is in the on-state, the motor 62 (to be described later) rotates in response to the switch 32a of the sensor 32 being pressed. A degree by which the switch 32a of the sensor 32 is pressed by the presser 30 (press-in degree of the switch 32a) varies in accordance with a degree by which the trigger operation portion 28 is pressed (press-in degree of the trigger operation portion 28).

The cruise valve 26 comprises a valve operation portion 34, an intermediate portion 36, and a stopper 38. The valve operation portion 34 is disposed outside the main grip 14 (see FIG. 1). The valve operation portion 34 is configured to be operated by the operator. The valve operation portion 34 is configured to pivot about a pivot axis extending in the right-left direction. The valve operation portion 34 is configured to be fixed at any desired pivot position. The intermediate portion 36 is connected to the valve operation portion 34. Although omitted from the drawings, the intermediate portion 36 is disposed inside the main grip 14. The intermediate portion 36 is configured to pivot integrally with the valve operation portion 34. The stopper 38 extends rightward from an outer edge of the intermediate portion 36. The stopper 38 is configured to contact the presser 30 of the trigger 24. In response to the valve operation portion 34 being pivoted forward, the stopper 38 pivots and comes into contact with the presser 30. In response to the valve operation portion 34 being further pivoted forward, the stopper 38 pivots forward together with the presser 30. When the valve operation portion 34 is fixed at a desired pivot position, the stopper 38 is thereby fixed. The stopper 38 prevents the presser 30 from moving rearward. Thus, the press-in degree of the switch 32a of the sensor 32 does not become equal to or less than a predetermined degree.

Figure 3:
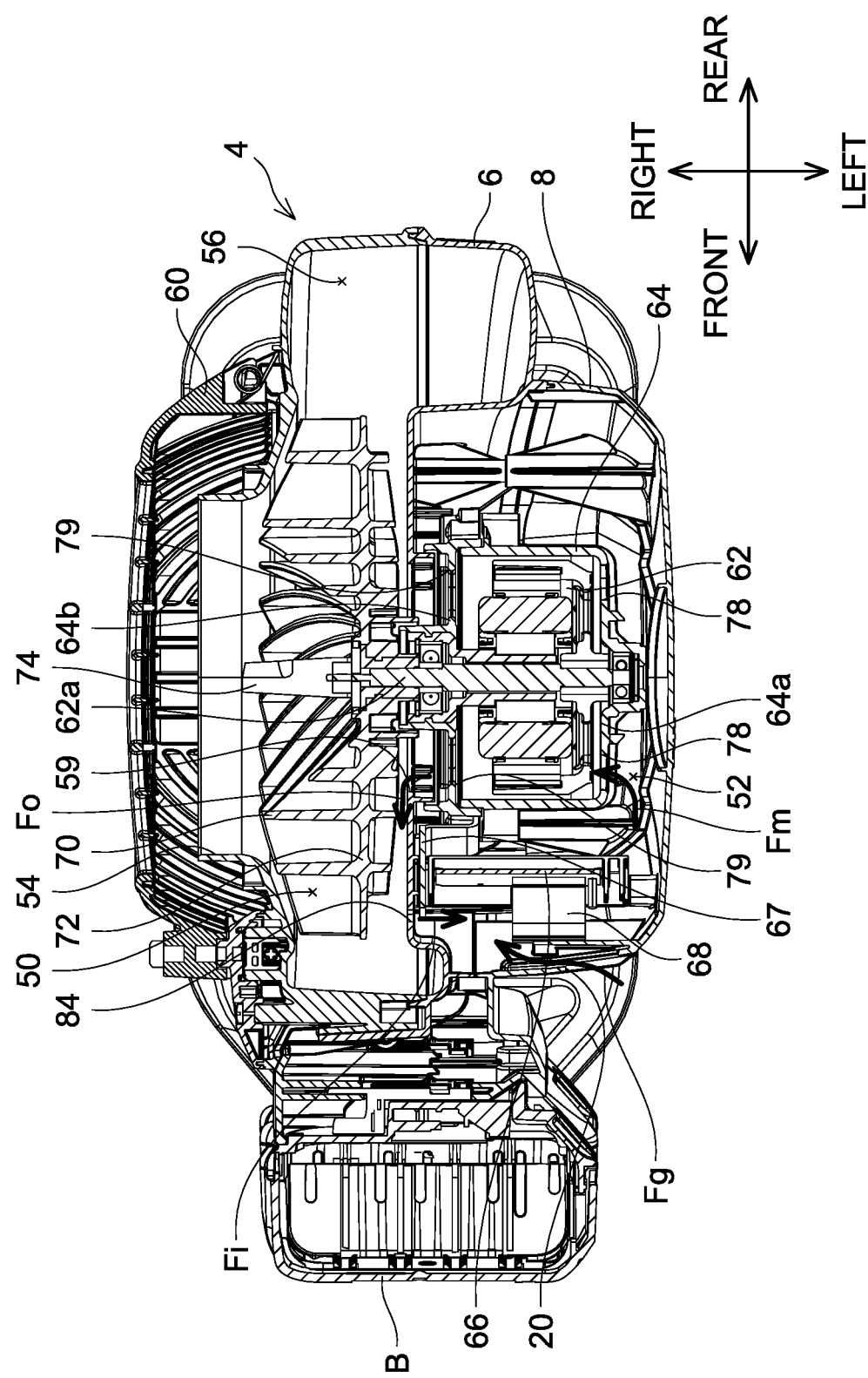
FIG. 3 is a horizontal cross-sectional view of the blower 2 according to the first embodiment in the blow mode.
Figure 5:
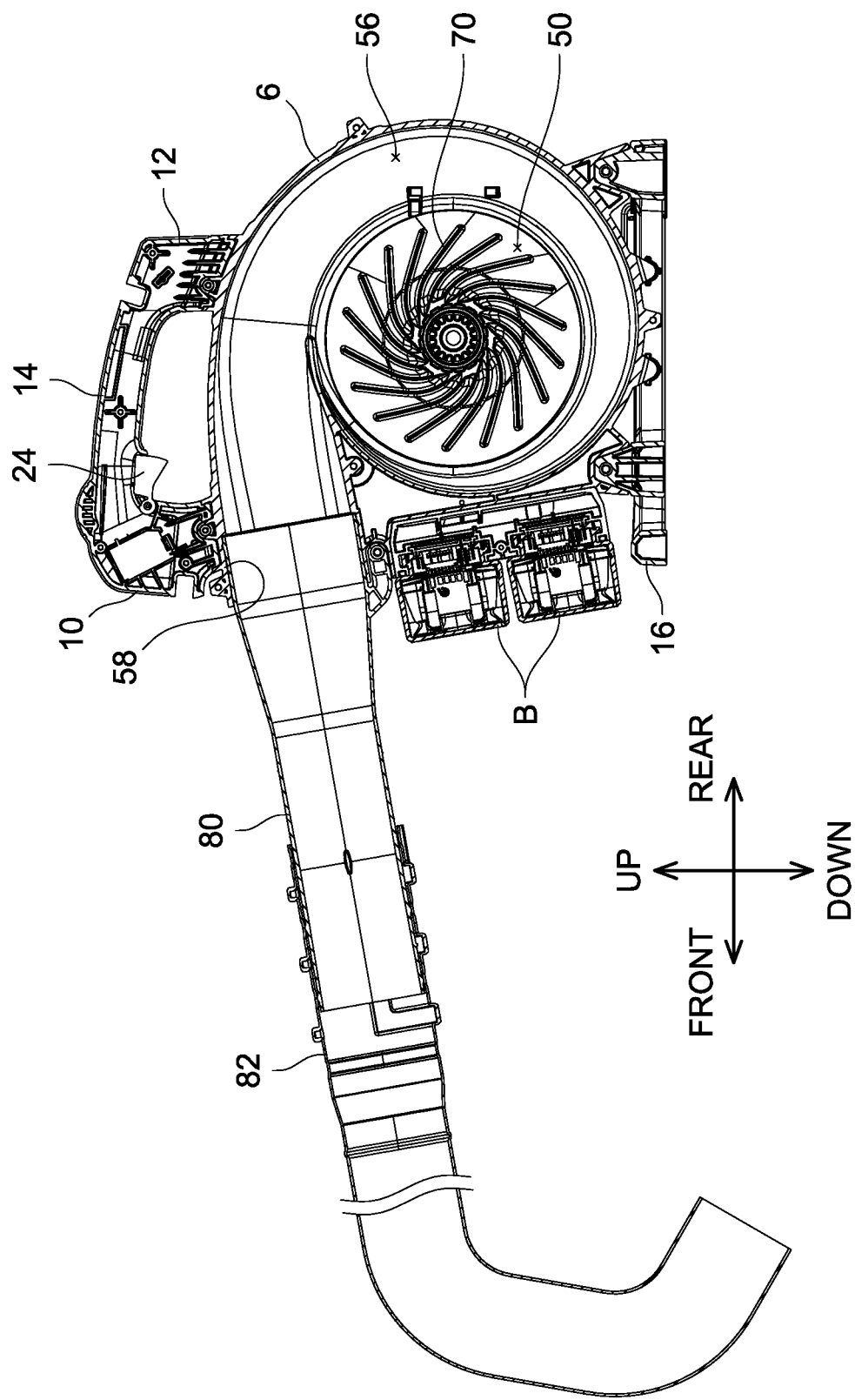
FIG. 5 is a vertical cross-sectional view of the blower 2 according to the first embodiment in the blow mode.

As shown in FIG. 3, the casing 4 includes a fan housing chamber 50, a motor housing chamber 52, a suction port 54, an airflow passage 56, and a discharge port 58 (see FIG. 5). The fan housing chamber 50 is defined inside the main casing 6. The motor housing chamber 52 is defined by the main casing 6 and the side casing 8. The motor housing chamber 52 is disposed left to the fan housing chamber 50. The fan housing chamber 50 and the motor housing chamber 52 communicate with each other through an opening 59 defined in the left side surface of the main casing 6. The suction port 54 is disposed on a right side surface of the main casing 6. The suction port 54 penetrates the right side surface of the main casing 6. The suction port 54 communicates with the fan housing chamber 50. The airflow passage 56 communicates with the fan housing chamber 50. As shown in FIG. 5, the airflow passage 56 extends spirally about an axis extending in the right-left direction. When the blower 2 is seen along a right direction, the airflow passage 56 extends counter-clockwise from the inside to the outside. The discharge port 58 communicates with the airflow passage 56. The discharge port 58 is disposed on an upper portion of the front surface of the main casing 6.

As shown in FIG. 3, the blower 2 further comprises a cover 60, the motor 62, a motor housing 64, the control board 66, a metal plate 67, a centrifugal fan 70, a cooling fan 72, and blades 74. The cover 60 is disposed on the right side surface of the main casing 6. The cover 60 is pivotable with respect to the main casing 6 about a pivot axis extending in the up-down direction. The cover 60 covers the suction port 54. A plurality of small openings is defined in the cover 60.

The motor housing 64, the motor 62, and the control board 66 are disposed in the motor housing chamber 52. The motor housing 64 is fixed to the left side surface of the main casing 6 with screws. The motor housing 64 covers the opening 59 of the main casing 6. The motor housing 64 includes a motor suction port 78 and a motor discharge port 79. The motor suction port 78 is disposed on a left side surface 64a of the motor housing 64. The motor suction port 78 penetrates the left side surface 64a of the motor housing 64. The motor discharge port 79 is disposed on a right side surface 64b of the motor housing 64. The motor discharge port 79 penetrates the right side surface 64b of the motor housing 64. The right side surface 64b of the motor housing 64 faces the left side surface of the main casing 6.

The motor 62 is disposed inside the motor housing 64. The motor 62 may, for example, be a brushless motor. In a variant, the motor 62 may be a brush motor. The rotation shaft 62a of the motor 62 rotates by the power from the batteries B. The rotation shaft 62a of the motor 62 extends in the right-left direction. The rotation shaft 62a is inserted in the opening 59 of the main casing 6. A left end of the rotation shaft 62a is disposed in the motor housing chamber 52 and a right end of the rotation shaft 62a is disposed in the fan housing chamber 50.

The control board 66 is disposed close to the batteries B. The control board 66 is electrically connected to the motor 62 and the sensor 32. In response to the switch 32a of the sensor 32 being pressed by the trigger 24 being pressed, the control board 66 rotates the motor 62. The control board 66 adjusts a rotation speed of the motor 62 in accordance with the press-in degree of the switch 32a.

Figure 4:
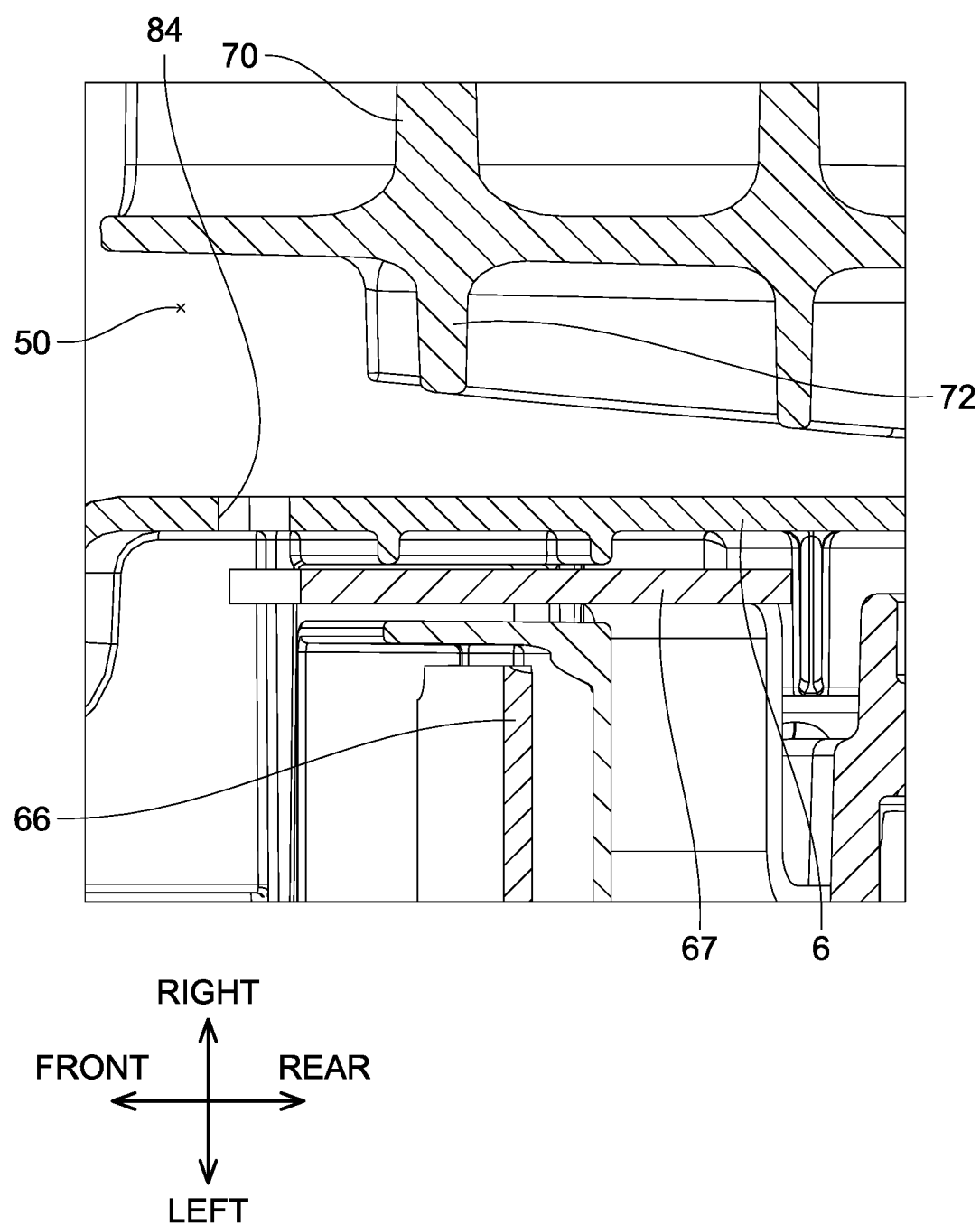
FIG. 4 is an enlarged view of a vicinity of a communication hole 84 shown in FIG. 3.

As shown in FIG. 4, the metal plate 67 is disposed between the left side surface of the main casing 6 and the control board 66. The enlarged diagram of FIG. 4 is surrounded by a square for easier view. The metal plate 67 is connected to the main grip 14 via wiring that is not shown.

As shown in FIG. 3, the centrifugal fan 70, the cooling fan 72, and the blades 74 are disposed in the fan housing chamber 50. The centrifugal fan 70 is constituted of a resin material. The centrifugal fan 70 is fitted to a portion of the rotation shaft 62a of the motor 62 near the right end thereof. The cooling fan 72 is constituted of a resin material. With respect to the right-left direction, the cooling fan 72 is disposed between the centrifugal fan 70 and the opening 59 of the main casing 6. The cooling fan 72 is disposed on a left surface of the centrifugal fan 70. The left surface of the centrifugal fan 70 faces the left side surface of the main casing 6. The blades 74 are fitted to the right end of the rotation shaft 62a of the motor 62.

Figure 6:
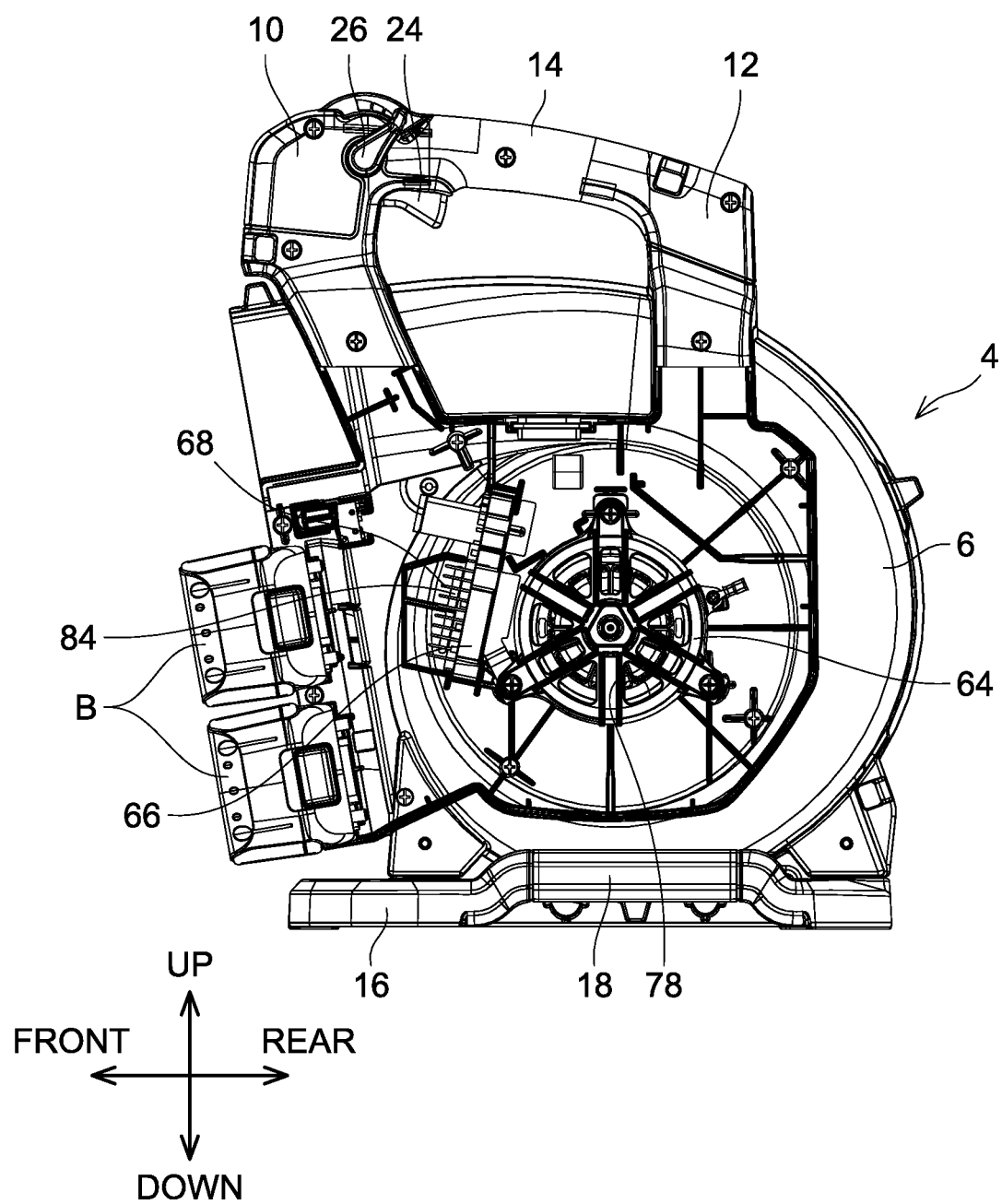
FIG. 6 is a left side view of the blower 2 according to the first embodiment in the blow mode with a side casing 8 detached.

As shown in FIG. 6, the blower 2 further comprises heat dissipating fins 68. The heat dissipating fins 68 are disposed on the control board 66. The heat dissipating fins 68 are disposed with an interval between each other. The heat dissipating fins 68 extend in the right-left direction.

The main casing 6 further includes a communication hole 84. The communication hole 84 has an elongated shape. When the blower 2 is seen along the right direction, the communication hole 84 overlaps the heat dissipating fins 68. As shown in FIG. 3, the communication hole 84 penetrates the left side surface of the main casing 6. The communication hole 84 communicates the fan housing chamber 50 with the motor housing chamber 52. The communication hole 84 is disposed to be apart from the opening 59 of the main casing 6 and be located outward of the opening 59 in a radial direction of the rotation shaft 62a. The communication hole 84 is disposed inward of a circumferential edge of the centrifugal fan 70 in the radial direction of the rotation shaft 62a. With respect to the right-left direction, the communication hole 84 overlaps the centrifugal fan 70. The communication hole 84 is disposed near the control hoard 66 and the heat dissipating fins 68. The control hoard 66 is disposed on an imaginary line connecting the communication hole 84 with the motor suction port 78 of the motor housing 64.

As shown in FIG. 5, the blower 2 further comprises a fixed nozzle 80 and a blowing nozzle 82. The fixed nozzle 80 is inserted in the discharge port 58. The fixed nozzle 80 has an elongated cylinder shape. Air having passed through the discharge port 58 flows through the fixed nozzle 80.

The blowing nozzle 82 is detachably attached to a distal end of the fixed nozzle 80. The blowing nozzle 82 is an elongated nozzle. The blowing nozzle 82 may, for example, be a nozzle for rain gutters. The nozzle for rain gutters is used to blow off fallen leaves and the like having accumulated in a rain gutter attached to a building. The blowing nozzle 82 may, for example, have a length of 2 meters or more. The blowing nozzle 82 extends in its longitudinal direction and is curved near its distal end.

Next, a blow operation of the blower 2 in a blow mode will be described. For use of the blower 2 in the blow mode, the main grip 14 is gripped by the operator. When the trigger 24 is pressed in by the operator and the motor 62 thereby rotates, the centrifugal fan 70, the cooling fan 72. and the blades 74 rotate about the rotation shaft 62a. This makes air flow leftward from the suction port 54 and flow into the fan housing chamber 50. The air having flowed into the fan housing chamber 50 is fed radially out in radial directions of the rotation shall 62a by the centrifugal Ian 70. This air is guided to the main casing 6, flows through the airflow passage 56, and is discharged from the main casing 6 through the discharge port 58. After this, the air flows through the fixed nozzle 80 and the blowing nozzle 82. and then is ejected from the distal end opening of the blowing nozzle 82. As a result, for example. when the distal end opening of the blowing nozzle 82 is directed toward a rain gutter. fallen leaves and the like having accumulated in the rain gutter are blown off. Further, when the valve operation portion 34 of the cruise valve 26 is pivoted forward and fixed at a predetermined position by the operator operating the cruise valve 26, the switch 32a of the sensor 32 is maintained in a state of being pressed in by a predetermined degree. Thus, the fallen leaves and the like having accumulated in the rain gutter are blown off even though the operator let go of the trigger 24.

While the centrifugal fan 70 is rotating by the rotation of the motor 62, a pressure in the airflow passage 56 and a pressure in a portion of the fan housing chamber 50 near the communication hole 84 are high. Thus, the pressure in the portion of the fan housing chamber 50 near the communication hole 84 is higher than a pressure in a portion of the motor housing chamber 52 near the communication hole 84. Due to this, as shown by an arrow Fi of FIG. 3, the air flows from the fan housing chamber 50 to the motor housing chamber 52 through the communication hole 84. Since a pressure in a portion of the fan housing chamber 50 near the opening 59 is a negative pressure due to the rotation of the cooling fan 72, the air flows through the communication hole 84, flows through the motor housing chamber 52, and then flows into the fan housing chamber 50 through the opening 59. Specifically, the air having flowed through the communication hole 84 is firstly guided by the heat dissipating fins 68 and flows on the control board 66. While flowing on the control board 66, this air merges with air flowing into the motor housing chamber 52 from the outside of the blower 2 through the suction ports 20 (that is, the air flowing in a direction of an arrow Fg shown in FIG. 3). Then, the air flows toward the motor suction port 78 as indicated by an arrow Fm in FIG. 3 and then is suctioned into the motor housing 64. Then, as indicated by an arrow Fo in FIG. 3, the air flows through the motor discharge port 79 and the opening 59 and flows from the motor housing chamber 52 to the fan housing chamber 50. After this, at least a part of the air having been fed radially outward in the radial directions of the rotation shaft 62a by the cooling fan 72 flows through the communication hole 84 and flows from the fan housing chamber 50 to the motor housing chamber 52. In this way, an air circulation passage is formed between the fan housing chamber 50 and the motor housing chamber 52 via the communication hole 84 and the opening 59. As a result, the control board 66 disposed on this air circulation passage is cooled.

Figure 7:
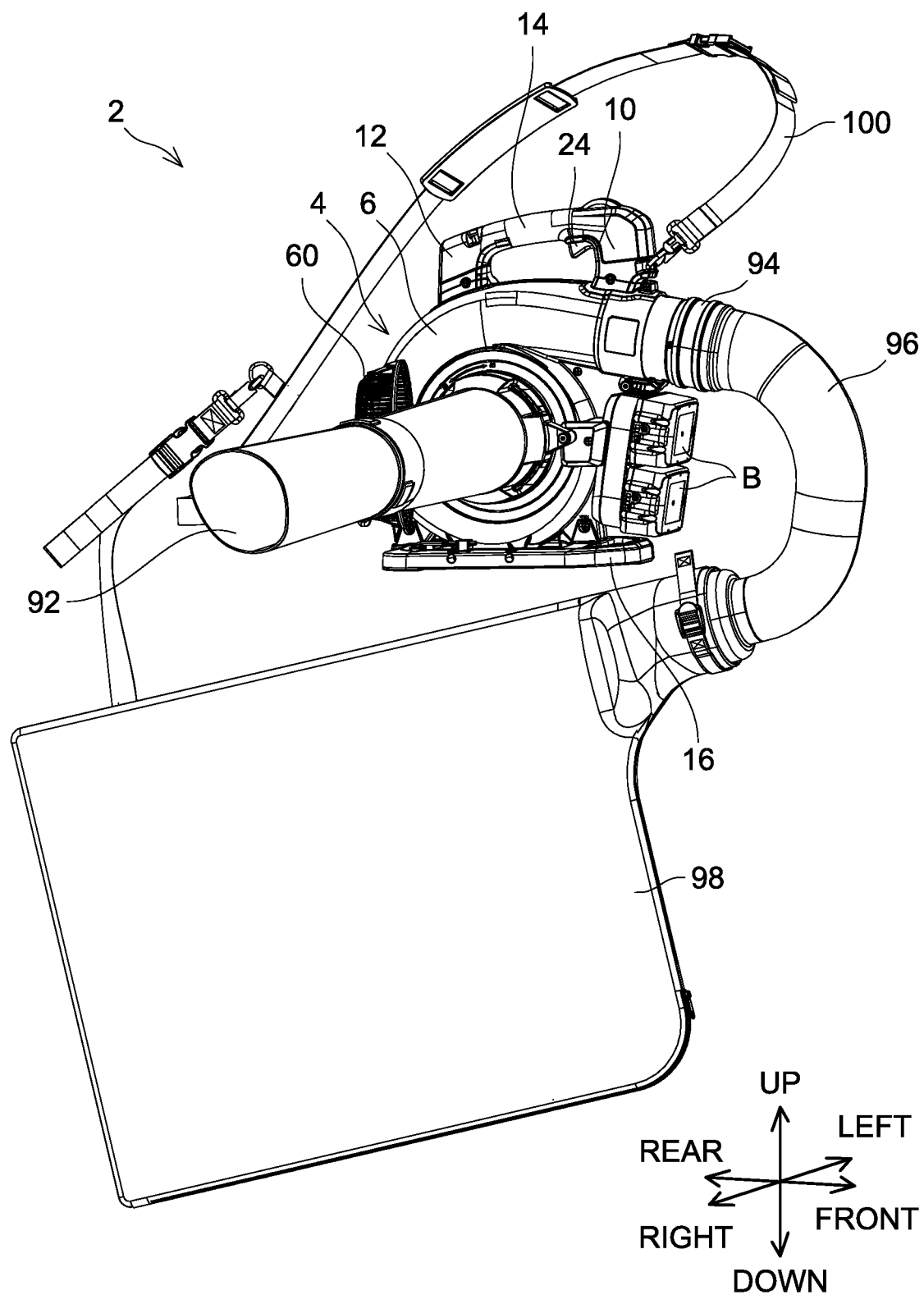
FIG. 7 is a perspective view of the blower 2 according to the first embodiment in a suctioning mode.

A configuration of the blower 2 in a suctioning mode will be described with reference to FIG. 7. Some of constituent components of the blower 2 used in the suctioning mode are different from constituent components of the blower 2 used in the blow mode. As shown in FIG. 7, the blower 2 comprises a suction nozzle 92, a joint 94, a flexible nozzle 96, and a garbage bag 98. instead of the fixed nozzle 80 and the blowing nozzle 82. The suction nozzle 92 is attached to the main casing 6 around the suction port 54 (not shown in FIG. 7) with the cover 60 opened.

Although not shown. the joint 94 is inserted into the discharge port 58. One end of the flexible nozzle 96 is attached to a distal end of the joint 94. The garbage bag 98 is attached to another end of the flexible nozzle 96.

The blower 2 further comprises a harness 100. Both ends of the harness 100 are detachably attached to the casing 4. The harness 100 is detachably attached to the garbage bag 98 at any position between the both ends.

A suction operation of the blower 2 in the suctioning mode will be described. For use of the blower 2 in the suctioning mode. the main grip 14 and the sub grip 18 are gripped by the operator. Further, the harness 100 is worn over the shoulder of the operator. When the trigger 24 is pressed in by the operator and the motor 62 thereby rotates, the centrifugal fan 70, the cooling fan 72, and the blades 74 rotate about the rotation shall 62a. Then, when a distal end opening of the suction nozzle 92 is directed toward the ground, fallen leaves and the like on the ground are suctioned into the suction nozzle 92, pass through the suction port 54. the fan housing chamber 50, the airflow passage 56. the discharge port 58, the joint 94, and the flexible nozzle 96 in this order. and then are collected into the garbage bag 98. The fallen leaves are broken up by the blades 74. As described above in connection to the use of the blower 2 in the blow mode, an air circulation passage is formed between the fan housing chamber 50 and the motor housing chamber 52 via the communication hole 84 and the opening 59.

Figure 8:
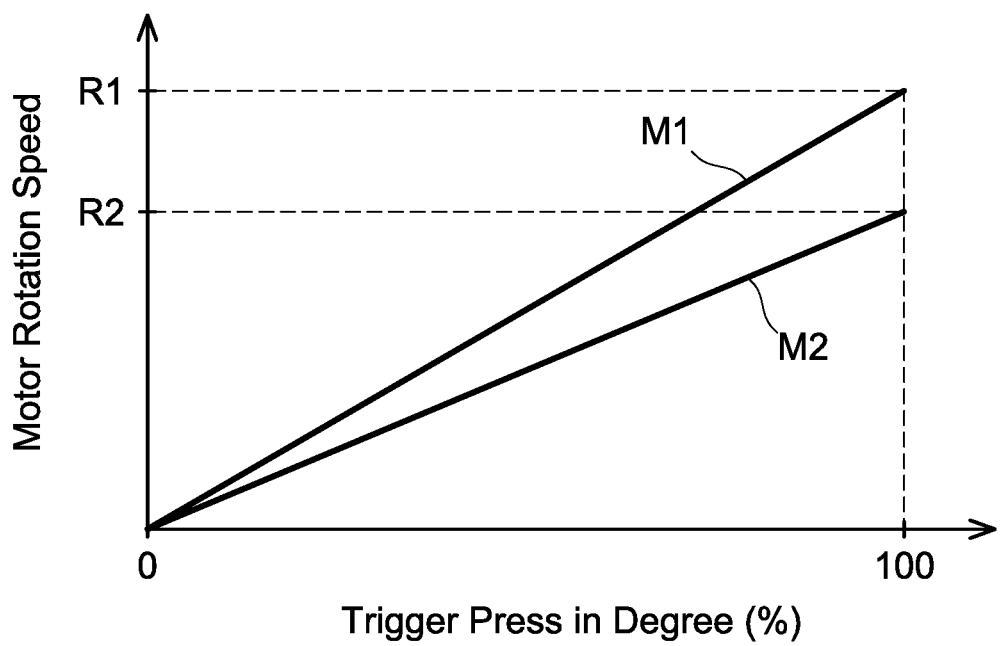
FIG. 8 is a graph showing a relationship of a trigger press-in degree and a motor rotation speed in each of a normal mode and a low speed mode which are executed by a control board 66 of the blower 2 according to the first embodiment.

In the present embodiment, as shown in FIG. 8, the control board 66 is configured to execute a normal mode M1 and a low speed mode M2. The normal mode M1 is a mode that is set in response to the blower 2 being switched from the off-state to the on-state by the operator pressing the main power switch 42. In response to the main power switch 42 being long-pressed for a predetermined number of seconds or longer while the control board 66 is in the normal mode M1, the control hoard 66 switches from the normal mode M1 to the low speed mode M2. At this switching, the display window 44b of the display 44 (see FIG. 1) lights up. Further, in response to the main power switch 42 being long-pressed for the predetermined number of seconds or longer while the control board 66 is in the low speed mode M2, the control hoard 66 switches from the low speed mode M2 to the normal mode M1. At this switching, the light of the display window 44*h* of the display 44 goes off. The predetermined number of seconds may, for example, be one second or longer. In the present embodiment, the predetermined number of seconds is two seconds or longer.

The normal mode M1 is primarily used for the use of the blower 2 in the blow mode. As shown in FIG. 8, when the trigger 24 is not pressed in and the control board 66 is in the normal mode M1, that is, when the press-in degree of the trigger 24 is 0% and the control board 66 is in the normal mode M1, the press-in degree of the switch 32*a* of the sensor 32 is 0% and thus the rotation speed of the motor 62 is zero. As the press-in degree of the trigger 24 increases from 0% up to 100%, that is, as the press-in degree of the switch 32*a* of the sensor 32 increases from 0% to 100%, the rotation speed of the motor 62 gradually increases up to a maximum rotation speed R1. Accordingly, when the blower 2 is used in the blow mode, the greater the press-in degree of the trigger 24 is, the higher the flow rate of air blowing out from the distal end opening of the blowing nozzle 82 is.

The low speed mode M2 is primarily used for the use of the blower 2 in the suctioning mode. When the trigger 24 is not pressed in and the control board 66 is in the low speed mode M2, that is, when the press-in degree of the trigger 24 is 0% and the control board 66 is in the low speed mode M2, the press-in degree of the switch 32*a* of the sensor 32 is 0% and the rotation speed of the motor 62 is zero. As the press-in degree of the trigger 24 increases from 0% up to 100%, that is, as the press-in degree of the switch 32*a* of the sensor 32 increases from 0% to 100%, the rotation speed of the motor 62 gradually increases to a target rotation speed R2. Accordingly, when the blower 2 is used in the suctioning mode, the greater the press-in degree of the trigger 24 is, the higher the flow rate of air suctioned from the distal end opening of the suction nozzle 92 is. Thus, the suction power to suction an object is higher with a greater press-in degree of the trigger 24. The target rotation speed R2 may, for example, be equal to or less than 70% of the maximum rotation speed R1 in the normal mode M1. In a variant, the target rotation speed R2 may, for example, be equal to or less than 50% of the maximum rotation speed R1.

While the motor 62 is rotating at the target rotation speed R2 in the low speed mode M2, the blower 2 suctions relatively-light objects such as fallen leaves (for example, objects of 5 grams or less), whereas it does not suction relatively-heavy objects such as pebbles (for example, objects of 5 grams or more). While the motor 62 is rotating at the target rotation speed R2 in the low speed mode M2, the suction power of the blower 2 is 50 to 100 W. Here, the suction power is a value calculated by multiplying a suctioned air amount, a suctioning pressure, and a predetermined coefficient.

In the present embodiment, the blower 2 comprises the casing 4, the motor 62, the centrifugal fan 70, and the control board 66. The casing 4 comprises therein the motor housing chamber 52 and the fan housing chamber 50 that communicate with each other through the opening 59. As shown in FIG. 3, the motor 62 is disposed in the motor housing chamber 52 and the rotation shaft 62*a* thereof is inserted in the opening 59. The centrifugal fan 70 is disposed in the fan housing chamber 50 and is configured to rotate about the rotation shaft 62*a* with rotation of the motor 62. The control hoard 66 is disposed in the motor housing chamber 52 and is configured to control the rotation of the motor 62. The casing 4 further comprises the communication hole 84 communicating the motor housing chamber 52 with the fan housing chamber 50 and located apart from the opening 59. In this configuration, when a pressure in the fan housing chamber 50 becomes higher than a pressure in the motor housing chamber 52, air flows from the fan housing chamber 50 to the motor housing chamber 52 through the communication hole 84 and also flows from the motor housing chamber 52 to the fan housing chamber 50 through the opening 59. Thus, the air flows in the motor housing chamber 52 even when the pressure in the fan housing chamber 50 is higher than the pressure in the motor housing chamber 52, and the control board 66 is cooled sufficiently by this air. As a result, the control board 66 can be suppressed from reaching a high temperature.

As shown in FIG. 3, the communication hole 84 is disposed so as to overlap the centrifugal fan 70 in the direction of the rotation shaft 62*a*. In this configuration, the centrifugal fan 70 feeds air radially outward. Due to this, disposing the communication hole 84 to overlap the centrifugal fan 70 with respect to the direction of the rotation shaft 62*a* suppresses the air fed out by the centrifugal fan 70 from flowing from the fan housing chamber 50 into the motor housing chamber 52 through the communication hole 84. This can suppress decrease in a flow rate of air blowing out from the blower 2.

The blower 2 further comprises the batteries B configured to supply power to the motor 62. This configuration enables the blower 2 to be used in an operation area where there is no external power source.

The batteries B are disposed close to the control board 66. This configuration allows a length of wiring that connects the batteries B to the control board 66 to be short. This provides improved arrangement of the wiring.

The blower 2 further comprises heat dissipating tins 68 disposed in the motor housing chamber 52 and configured to guide the air flowing in the motor housing chamber 52. The heat dissipating fins 68 are disposed on the control board 66. In this configuration, the air is guided by the heat dissipating fin and flows on the control hoard 66. Thus, the control board 66 can be cooled efficiently. As a result, the control board 66 can be suppressed from reaching a high temperature.

As shown in FIG. 3, the blower 2 further comprises the cooling fan 72 disposed between the opening 59 and the centrifugal fan 70 with respect to the direction of the rotation shaft 62*a*. The cooling fan 72 is configured to rotate with the centrifugal fan 70. In this configuration, when the cooling fan 72 rotates, a pressure in a space near the cooling fan 72 decreases. This enables the air to efficiently flow from the motor housing chamber 52 to the fan housing chamber 50 through the opening 59. As a result, a flow rate of the air flowing in the motor housing chamber 52 increases, and the control hoard 66 can thereby be cooled efficiently. As a result, the control board 66 can be suppressed from reaching a high temperature.

As shown in FIG. 5, the casing 4 includes the discharge port 58 configured to discharge the air fed out by the centrifugal fan 70 to the outside of the casing 4. The blower 2 further comprises the blowing nozzle 82 in which the air discharged from the discharge port 58 flows. The blowing nozzle 82 is an elongated nozzle. When an elongated nozzle is used as the blowing nozzle, the pressure in the fan housing chamber 50 generally becomes high with the centrifugal fan rotating. As such, if the blower 2 does not comprise the communication hole 84, air may be less likely to flow from the motor housing chamber 52 to the fan housing chamber 50 through the opening 59 when the pressure in the fan housing chamber 50 is higher than the pressure in the motor housing chamber 52. As a result, the control board 66 may not be sufficiently cooled and may reach a high temperature. In the above configuration, the communication hole 84 communicates the motor housing chamber 52 with the fan housing chamber 50, thus air sufficiently flows through the motor housing chamber 52 and the control board 66 is sufficiently cooled even when the elongated nozzle is used as the blowing nozzle 82. Thus, the control board 66 can be suppressed from reaching a high temperature.

As shown in FIG. 3, the control board 66 is disposed on a flow passage of the air flowing in the motor housing chamber 52 from the communication hole 84 toward the motor 62. In this configuration, the air flows on the control board 66. Thus, the control board 66 can be cooled efficiently. As a result, the control board 66 can be suppressed from reaching a high temperature.

As shown in FIG. 3, the blower 2 further comprises the motor housing 64 that houses the motor 62. The motor housing 64 includes the motor suction port 78 through which air is suctioned into the motor housing 64. The control hoard 66 is disposed on the imaginary line connecting the communication hole 84 with the motor suction port 78. In this configuration, the control board 66 is disposed on a line connecting the communication hole 84 with the motor suction port 78 by shortest distance. Thus, the control board 66 can be cooled efficiently. As a result, the control board 66 can be suppressed from reaching a high temperature.

In the present embodiment, the blower 2 comprises the motor 62, the centrifugal fan 70, the casing 4, the trigger 24, and the control board 66. The centrifugal fan 70 is configured to rotate about the rotation shaft 62a with rotation of the motor 62. The casing 4 houses the motor 62 and the centrifugal fan 70 and is configured to guide air from the suction port 54 to the discharge port 58 as the centrifugal fan 70 rotates. The trigger 24 is configured to be pressed by the operator. The control board 66 is configured to control rotation of the motor 62. As shown in FIG. 8, the control hoard 66 includes the normal mode M1 and the low speed mode M2. In the normal mode M1, the control board 66 is configured to adjust the rotation speed of the motor 62 in accordance with the press-in degree of the trigger 24. In the low speed mode M2, the control board 66 is configured to adjust the rotation speed of the motor 62 to the target rotation speed R2. The target rotation speed R2 is lower than the maximum rotation speed R1 of the motor 62 that is achieved when the press-in degree of the trigger 24 is a maximum degree in the normal mode M1. In this configuration, the target rotation speed R2 of the motor 62 in the low speed mode M2 is lower than the maximum rotation speed R1 of the motor 62 in the normal mode M1. Thus, the rotation speed of the centrifugal fan 70 is lower in the low speed mode M2 than in the normal mode M1. As a result, suction power of the blower 2 is lower in the low speed mode M2 than in the normal mode M1. Therefore, suction of pebbles can be reduced in the low speed mode M2 than in the normal mode M1. As a result, suction of pebbles can stably be reduced by the control board 66 being in the low speed mode M2.

As shown in FIG. 8, when the control board 66 is in the low speed mode M2, the rotation speed of the motor 62 gradually increases to the target rotation speed R2 as the press-in degree of the trigger 24 increases to the maximum degree. In this configuration, a flow rate of air to be suctioned into the suction port 54 varies according to the press-in degree of the trigger 24. Thus, the rotation speed of the motor 62, that is, the flow rate of air to be suctioned into the suction port 54 can freely be adjusted in accordance with a situation in the operation area.

The blower 2 further comprises the switch 42 configured to switch the normal mode M1 and the low speed mode M2 of the control board 66. This configuration enables the operator to switch the normal mode M1 and the low speed mode M2 by a simple operation of pressing the main power switch 42.

The switch 42 functions as the main power switch 42 configured to switch the on-state in which the rotation of the motor 62 is allowed and the off-state in which the rotation of the motor 62 is prohibited. When the main power switch 42 is long-pressed. the normal mode M1 and the low speed mode M2 of the control board 66 is switched. This configuration enables the operator to perform both a switching operation of switching the on-state and the off-state of the blower 2 and a switching operation of switching the normal mode M1 and the low speed mode M2 by using the main power switch 42. Thus, an additional switch for switching the normal mode M1 and the low speed mode M2 is not necessary.

The blower 2 further comprises the display 44 configured to display that the control hoard 66 is in the low speed mode M2. This configuration allows the operator to easily check whether the control board 66 is in the low speed mode M2 or not by information displayed on the display 44.

As shown in FIG. 4, the metal plate 67 is disposed between the left side surface of the main casing 6 and the control board 66. The metal plate 67 is connected to the main grip 14 via the wiring that is not shown. In the blower 2, when the centrifugal fan 70 rotates, static electricity accumulates in the main casing 6. If, for example, a metal material such as the metal plate 67 is not disposed between the left side surface of the main casing 6 and the control board 66. the control board 66 may erroneously operate due to the static electricity accumulated in the main casing 6. In the above configuration, the static electricity accumulated in the main casing 6 transfers to the ground from the metal plate 67 through the wiring, the main grip 14, and the body of the operator gripping the main grip 14. Therefore, erroneous operation of the control board 66 due to the static electricity can be suppressed.

(Corresponding Relationships)

The motor housing chamber 52 is an example of "first housing chamber" and the fan housing chamber 50 is an example of "second housing chamber".

Second Embodiment

Figure 9:
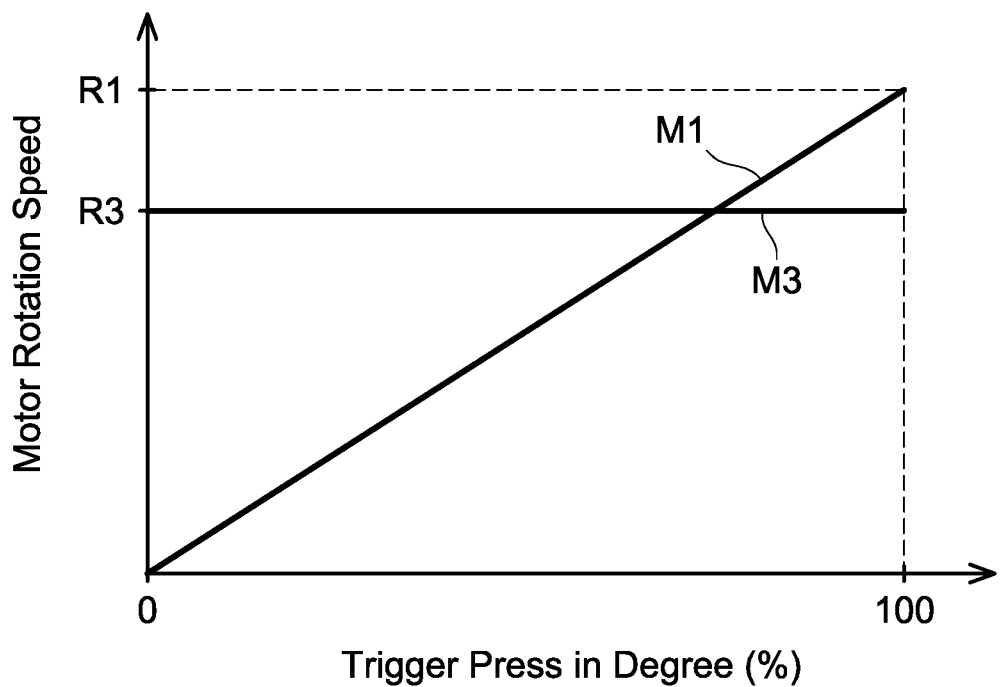
FIG. 9 is a graph showing a relationship of a trigger press-in degree and a motor rotation speed in each of a normal mode and a low speed mode which are executed by a control board 66 of a blower 2 according to a second embodiment.

A second embodiment will be described with reference to FIG. 9. For the second embodiment, features that differ from those of the first embodiment will be described and description on features that are the same as those of the first embodiment will be omitted. In the second embodiment, a low speed mode M3 executed by the control board 66 differs from the low speed mode M2 of the first embodiment. As shown in FIG. 9, when the control hoard 66 is in the low speed mode M3, the rotation speed of the motor 62 is constant at a target rotation speed R3 regardless of the press-in degree of the trigger 24. Further, the rotation speed of the motor 62 is constant at the target rotation speed R3 even though the trigger 24 is not pressed. Thus, when the control board 66 is in the low speed mode M3, the rotation speed of the centrifugal fan 70 is constant regardless of the press-in degree of the trigger 24. The target rotation speed R3 may, for example. be equal to or less than 70% of the maximum rotation speed R1 in the normal mode M1. In a variant, the target rotation speed R3 may, for example, be equal to or less than 50% of the maximum rotation speed R1.

In the present embodiment, as shown in FIG. 9, when the control board 66 is in the low speed mode M3, the rotation speed of the motor 62 is constant at the target rotation speed R3 regardless of the press-in degree of the trigger 24. In this configuration, the rotation speed of the centrifugal fan 70 is constant regardless of the press-in degree of the trigger 24, which results in constant suction power. This enables the operator to easily perform a suctioning operation using the blower 2.

In one embodiment, the communication hole 84 may be disposed outward of the centrifugal fan 70 in the radial direction of the rotation shall 62a.

In one embodiment, the blower 2 may not comprise the heat dissipating fins 68.

In one embodiment, the blower 2 may be electrically connected to an external power source via a power cable.

In one embodiment, the cooling fan 72 may be disposed in the motor housing chamber 52.

In one embodiment, the blower 2 may comprise a switch configured to switch the normal mode M1 and the low speed mode M2 of the control board 66, in addition to the main power switch 42. This switch may be of button type or may be of dial type.

In one embodiment of the blower 2, the rotation speed of the motor 62 may be zero when the control board 66 is in the low speed mode M3 and the trigger is not pressed in.

What is claimed is:

1. A blower, comprising:
   a motor;
   a centrifugal fan configured to rotate about a rotation shaft with rotation of the motor;
   a casing which houses the motor and the centrifugal fan and is configured to guide air from a suction port to a discharge port as the centrifugal fan rotates:
   a trigger configured to be pressed by an operator; and
   a control board configured to control rotation of the motor, wherein
   the control board includes a normal mode and a low speed mode,
   in the normal mode, the control board is configured to adjust a rotation speed of the motor in accordance with a degree by which the trigger is pressed, and
   in the low speed mode, the control board is configured to adjust the rotation speed of the motor to a target rotation speed, wherein the target rotation speed is lower than a maximum rotation speed of the motor that is achieved when the degree by which the trigger is pressed is a maximum degree in the normal mode.

2. The blower according to claim 1, wherein when the control board is in the low speed mode, the rotation speed of the motor gradually increases to the target rotation speed as the degree by which the trigger is pressed increases to the maximum degree.

3. The blower according to claim 1, wherein when the control board is in the low speed mode, the rotation speed of the motor is constant at the target rotation speed regardless of the degree by which the trigger is pressed.

4. The blower according to claim 1, further comprising a switch configured to switch the normal mode and the low speed mode of the control board.

5. The blower according to claim 4, wherein
   the switch functions as a main power switch configured to switch an on-state in which the rotation of the motor is allowed and an off-state in which the rotation of the motor is prohibited, and
   when the switch is long-pressed, the normal mode and the low speed mode of the control board are switched.

6. The blower according to claim 1, further comprising a display configured to display that the control board is in the low speed mode.

* * * * *